(12) United States Patent
Elkington et al.

(10) Patent No.: US 8,870,243 B2
(45) Date of Patent: Oct. 28, 2014

(54) SINGLE-MOTION MECHANICALLY LEVERAGED LATCH APPARATUS FOR HORSE TRAILER STALL DIVIDER

(75) Inventors: Dusty Lee Elkington, Moundville, MO (US); Kenneth Patrick Richmond, Nevada, MO (US)

(73) Assignee: Short Go, Inc., Fort Scott, KS (US)

( * ) Notice: Subject to any disclaimer, the term of this patent is extended or adjusted under 35 U.S.C. 154(b) by 785 days.

(21) Appl. No.: 12/039,276

(22) Filed: Feb. 28, 2008

(65) Prior Publication Data

US 2009/0218826 A1    Sep. 3, 2009

(51) Int. Cl.
| | |
|---|---|
| *E05C 1/12* | (2006.01) |
| *B60P 3/04* | (2006.01) |
| *E05C 1/08* | (2006.01) |

(52) U.S. Cl.
CPC .... *E05C 1/12* (2013.01); *B60P 3/04* (2013.01)
USPC ...................... 292/169.17; 292/163

(58) Field of Classification Search
CPC .......................................................... E05C 1/10
USPC ....... 292/169.17, 166, 168, DIG. 13, 163, 57, 292/58, 60, 62, 247, 248, 63, 64, 66
See application file for complete search history.

(56) References Cited

U.S. PATENT DOCUMENTS

| | | | | |
|---|---|---|---|---|
| 1,615,120 | A * | 1/1927 | Fischer | 292/38 |
| 3,697,106 | A * | 10/1972 | Meyer | 292/175 |
| 4,744,392 | A * | 5/1988 | Tade et al. | 138/89 |
| 6,006,560 | A * | 12/1999 | DeVries | 70/208 |
| 6,024,388 | A * | 2/2000 | Tomah et al. | 292/216 |
| 6,349,981 | B1 * | 2/2002 | King | 292/61 |
| 6,481,158 | B1 * | 11/2002 | Marks | 49/57 |
| 6,895,897 | B1 | 5/2005 | Culp et al. | |
| 6,904,869 | B1 * | 6/2005 | Geisthardt | 119/524 |
| 7,040,253 | B1 * | 5/2006 | Clark et al. | 119/412 |
| 7,066,502 | B1 * | 6/2006 | Makus | 292/139 |
| 7,124,711 | B1 * | 10/2006 | Bearden | 119/412 |
| 2007/0023431 | A1 * | 2/2007 | Rouns | 220/210 |
| 2007/0120377 | A1 * | 5/2007 | King et al. | 292/163 |

* cited by examiner

*Primary Examiner* — Kristina Fulton
*Assistant Examiner* — Faria Ahmad
(74) *Attorney, Agent, or Firm* — Jones Walker, LLP

(57) ABSTRACT

A latch assembly (8) for securing and releasing a horse trailer divider (100), the latch assembly (8) having a mechanically leveraged handle (10) coupled to a latchbolt (13), the handle (10) and the latchbolt (13) having a latched position and an unlatched position. In one embodiment, the latch assembly (8) may be incorporated into a divider (100) having a first end (107A) hinged to a first wall (130) of the trailer and a second end (107B) releasably securable to a second wall (122). The latch assembly (8) may comprise a handle (10) operatively coupled to an axle (14) for being extended to its latched position and retracted to its unlatched position by operation of the handle (10). The handle may comprise an angled portion (10A) to improve access to the fingers of the user's hand.

8 Claims, 5 Drawing Sheets

US 8,870,243 B2

SINGLE-MOTION MECHANICALLY LEVERAGED LATCH APPARATUS FOR HORSE TRAILER STALL DIVIDER

BACKGROUND OF THE INVENTION

1. Field of the Invention

The present invention relates to a latch apparatus for releasably securing a divider in a horse trailer in a closed position. The present invention relates to a single-motion latch apparatus that provides a mechanical advantage to the user for withdrawing a latchbolt from a deployed position to release a divider from a closed position.

2. Description of the Related Art

Dividers are hinged panels or gates commonly used in livestock trailers to separate one stall from another adjacent stall. Generally, the dividers have a first end and a second end, and may be hinged at the first end to a first wall. The dividers may be spaced apart one from the others, and each divider may swing on hinges at the first end to position the second end either to be secured to a second wall that may be parallel to the first wall, or to be swung away from the second wall to open the stall. When in the closed position, the divider provides at least one side of a stall to contain an animal, such as a horse, during transit.

In some trailers, the hinged dividers swing between an open position and a closed position. When the dividers are swung to and secured in the closed position, the dividers, the first wall and the second wall together form a plurality of generally parallelogram-shaped stalls. The dividers, hinges and walls are preferably strong enough to withstand the forces that may be imparted by an animal as it may lean or shift during transit. The dividers separate animals within a trailer to reduce the likelihood of injury to an animal being transit.

The dividers within a livestock transport trailer may be hinged at a first end to a first wall and releasably securable at the second end to a second wall. When the divider is secured in the closed position using a latch apparatus, the stall formed by the closed divider provides for safe transport of the animal until the stall is opened by releasing the latch apparatus to allow the divider to swing. It is important that a user be able to quickly and safely open the divider. This is particularly important when an animal may be reluctant to enter the stall, or when an animal is anxious to exit the stall upon release of the latch apparatus. More spirited animals, such as horses, may be particularly apprehensive upon entering or exiting a trailer stall.

A variety of latch apparatuses have been used for releasably securing dividers in their closed positions within livestock trailers. Some prior art latch apparatuses secure the divider in the closed position with a sliding latchbolt. The latchbolt may be slidably received at or near the second end of the divider and slidable between a latched position in which the latchbolt protrudes from the divider and into a receiver on the second wall, and an unlatched position in which the latchbolt is withdrawn, at least partially, into the divider to withdraw from the receiver and release the divider from the closed position.

In general, prior art latch apparatuses having a sliding latchbolt may be mounted within an aperture or recess in the divider generally adjacent to the second end of the divider. The latchbolt may be slidable between its protruding and withdrawn positions within a latchbolt channel extending from the aperture where the latch apparatus is mounted to the second end of the divider. This arrangement is also found in a common door on a house. This type of prior art latch apparatuses may be difficult to operate, especially for women or children, if the latchbolt becomes rusted due to exposure to the environment. This type of latch apparatuses may also become difficult to operate if the latchbolt seizes within the latchbolt channel due to oxidation of metal components, or due to an accumulation of debris or grit. This type of latch apparatuses may also become difficult to operate if the hinges or divider cause the latchbolt channel to be misaligned with the receiver so that, when the latchbolt is in the protruding position and received within the receiver, a load is applied by the protruding latchbolt on the receiver, thereby resisting the withdrawal of the latchbolt from the receiver.

FIG. 1 is a perspective view of one embodiment of a prior art horse trailer with a floor 140 and with a plurality of dividers 100 secured in their closed positions to define stalls therebetween, and each divider 100 having a prior art latch apparatus 111. FIG. 2 is an enlarged perspective view of the prior art latch apparatus 111 shown in FIG. 1 with the latchbolt end 112A protruding from the edge 104 of the divider 100 as it is configured when the divider is in its closed position shown in FIG. 1 and the prior art latch apparatus is in the deployed position to hold the divider 100 closed, e.g., to contain an animal within a stall.

These prior art latchbolt devices 111 generally require two distinct motions to open the divider 100: the first motion to slide the latchbolt 112 within the latchbolt channel 108 by removing the latchbolt end 112A from the hole or recess in or mounted on the second wall 122 (see FIG. 1). The second motion is then to swing the divider 100 about its hinged first end 102 (see FIG. 1) and away from its closed position shown in FIG. 1 to an open position.

One or more of the above-described conditions may impair sliding movement of the latchbolt 112 within the latchbolt channel 108 of a divider 100. Since the latchbolt channel 108 is generally disposed in a horizontal direction that lies along the length of the divider 100, the force applied to the latchbolt 112 to slide it within the channel 108 is generally in a direction lateral to the torso of the user standing adjacent to the second end 104 of the divider 100 to operate the latch apparatus 111. It may be difficult for the user to impart sufficient force to the latchbolt 112 to cause it to slide within the channel 108 and to withdraw the latchbolt end 112A from the hole or receiver 120 on the second wall 122. It may be particularly difficult for a some individuals to exert a sufficient sliding force to the latchbolt 112 because the application of lateral force is an unnatural motion for a human, and the human arm may not be capable of generating a sufficient amount of force on the latchbolt 112 in a direction of the latchbolt channel 108.

Difficulty in operating a conventional latchbolt apparatus may expose the user to injury if the animal is eager to bolt from the stall the moment that the divider 100 is unlatched from the second wall 122 and before the user has finished the first motion and is ready to swing the divider 100 about its hinged first end 102.

What is needed is a latchbolt apparatus that enables the opening of the latch and the hinged displacement of the gate using a single motion that is more natural for the user, such as, for example, a pulling motion towards the torso of the user. What is needed is a latchbolt apparatus that does not require two distinct motions to unlatch the divider and to swing the divider away from its closed position. What is needed is a latchbolt apparatus that may be operated by the user using all four fingers of a hand to distribute the required force imparted to the apparatus. What is needed is a latchbolt apparatus that provides the user with a significant mechanical advantage to overcome a latchbolt that may be rusted, seized and/or misaligned with the receiver, or to provide the user with a latch that can be opened even when an animal leans or pushes against the divider placing the latchbolt in a bind.

SUMMARY OF THE INVENTION

The present invention provides a latchbolt device for securing and releasing a divider in a livestock trailer that satisfies some or all of the aforementioned needs. The present invention provides a latchbolt device for securing a divider within a livestock trailer that may be operated by a user using a single hand pulling motion that opens the latch apparatus and then swings the divider towards an open position upon unlatching the divider. The present invention provides a latchbolt device that provides a substantial mechanical advantage so that it may be operated by a smaller user, but it does not sacrifice any structural strength needed to contain an animal within the stall formed by closure and latching of the divider.

The present invention, which will be described in greater detail below, provides a new and improved latchbolt device that provides all the advantages of the prior art latchbolt devices, with none of the disadvantages. The latchbolt device of the current invention reduces the potential for injury to the user by making the divider easier to operate and reducing the time and the number of steps necessary to release and open the divider.

In one embodiment, the present invention comprises a latchbolt device having a latchbolt that is retractable within a latchbolt channel formed in a divider by rotation of an axle by the user. The latchbolt may be spring-biased to its deployed or latched position to substantially protrude, at its second end, from the edge of the divider. The rotatable axle may be rotatably secured within an aperture or a recess in the face of the divider, and coupled to the first end of a tensile member, such as, but not limited to, a generally flexible tether, coupled at its second end to the positionable latchbolt. The axle may be rotatable using a handle connected to the axle and adapted for being grasped by the user and pulled generally toward the user's body as he or she stands next to the divider. The axis of the latchbolt channel shown in the drawings appended hereto is substantially transverse to the axis of rotation of the axle. The handle provides a significant mechanical leverage for rotating the axle. The handle may be pulled generally in the direction of desired movement of the second end of the divider. The pulling motion will first release the latching apparatus, and then, after the latchbolt is withdrawn from its deployed condition to release the divider, the force of the pulling motion will impart to the divider a moment causing it to swing about its pivoted end.

To unlatch and swing the divider to its open position, the user may grasp and pull the handle to rotate the axle, thereby pulling the tensile member and the latchbolt coupled to the second end of the tensile member to withdraw the protruding, second end of the latchbolt from the hole or recess in, or mounted on, the second wall, to thereby release the divider to swing to an open position. For example, where the tensile member is a tether, the user may grasp and pull the handle to rotate the axle, thereby winding at least a portion of the tether about the axle to pull and reposition the latchbolt within the latchbolt channel, and to withdraw the protruding, second end of the latchbolt from the hole or recess in, or mounted on, the second wall, to thereby release the divider to swing to an open position. It should be understood by those skilled in the art that a solid tensile member may be pivotally coupled at its first end to an arm radially protruding from the axle, or a flexible tether may be connected to the axle, and either arrangement would serve to convert torque applied by the user through the handle and to the axle to pull and displace the latchbolt. It should be understood that, in an alternate embodiment, a tensile member may comprise a rod or other mechanical link.

In one embodiment, the recess or aperture within the divider that accommodates the latch apparatus comprises a pair of opposed and generally vertically aligned sockets for receiving and rotatably securing the ends of the rotatable axle. For example, a first socket may be disposed at a top side of the recess or aperture within the divider opposite a second socket disposed at a bottom side of the recess or aperture within the divider. Alternately, a pre-assembled latchbolt assembly pivotally securing the handle therewithin may be secured on the face of the divider to position the rotatable axle in position to pull a tensile member or, alternately, to wind up at least a portion of a tether, and to thereby position the latchbolt such as, for example, within a latchbolt channel in the edge of the divider or on the face of the divider and generally perpendicular to and aligned with the axis of the axle.

In one embodiment having a tether as the tensile member, the tether that couples the rotatable axle to the positionable latchbolt may be a flexible material such as wire, rope, chain, or any of a number of polymer or plastic straps, ropes or other tensile load bearing materials that are strong but compliant. For example, but not by way of limitation, the tether may be coupled at its first end to the axle using a fastener, such as a screw, bolt, clip, clamp or other retainer. Alternately, the first end of the tether may be coupled to the rotatable axle by inserting the first end of the tether through a hole in the rotatable axle, and by winding the tether about the circumference of the axle.

The opposite, second end of the tether may be coupled to the first end of the latchbolt using any of the same fasteners, or by being similarly threaded through a hole in the latchbolt. Alternately, the first end of the tether may be secured to the axle, or the second end of the tether may be secured to the latchbolt, using a compression fitting or a threaded fitting.

In one embodiment, the latchbolt may be slidable within a sleeve that may be disposed within the channel intermediate the latchbolt and a channel wall formed in the divider. The sleeve may be secured within the bore of the channel by friction, adhesive or in a number of other methods. Alternately, the latchbolt may be slidable within the channel without an intermediate member.

In one embodiment, the latchbolt may have an externally protruding shoulder at or near its second end to bear against a second end of a coil spring received within an annulus between the latchbolt and the sleeve or, alternately, between the latchbolt and the channel wall. Also, the sleeve or channel may comprise an internally protruding shoulder positioned at or near its first end to bear against the first end of a coil spring. The result is that the coil spring is captured intermediate the latchbolt shoulder and the channel shoulder (or the sleeve shoulder) to bias the latchbolt to its deployed position so that the latchbolt end protrudes from the edge of the divider. In this embodiment, the rotation of the axle by the user winds at least a portion of the first end of the tether onto the axle and repositions the latchbolt within the sleeve or channel against the force of the spring to compress the coil spring and withdraw the protruding, second end of the latchbolt from the recess or hole on or in the second wall. It should be appreciated that by biasing the latchbolt towards it deployed and protruding configuration using a coil spring, the latchbolt will be restored to its protruding position to be received into the hole or recess in the second wall, and to secure the divider in its closed position unless and until the handle is pulled by the user.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

For a better understanding of the invention, its operating advantages, and the specific objects attained by its uses, reference should be had to the accompanying drawings and descriptive matter in which there is illustrated and described a preferred embodiment of the invention.

BRIEF DESCRIPTION OF THE DRAWINGS

The invention will be better understood with consideration given to the following detailed description. Such description makes reference to the appended drawings wherein.

DETAILED DESCRIPTION OF THE PREFERRED EMBODIMENTS

Figure 1:
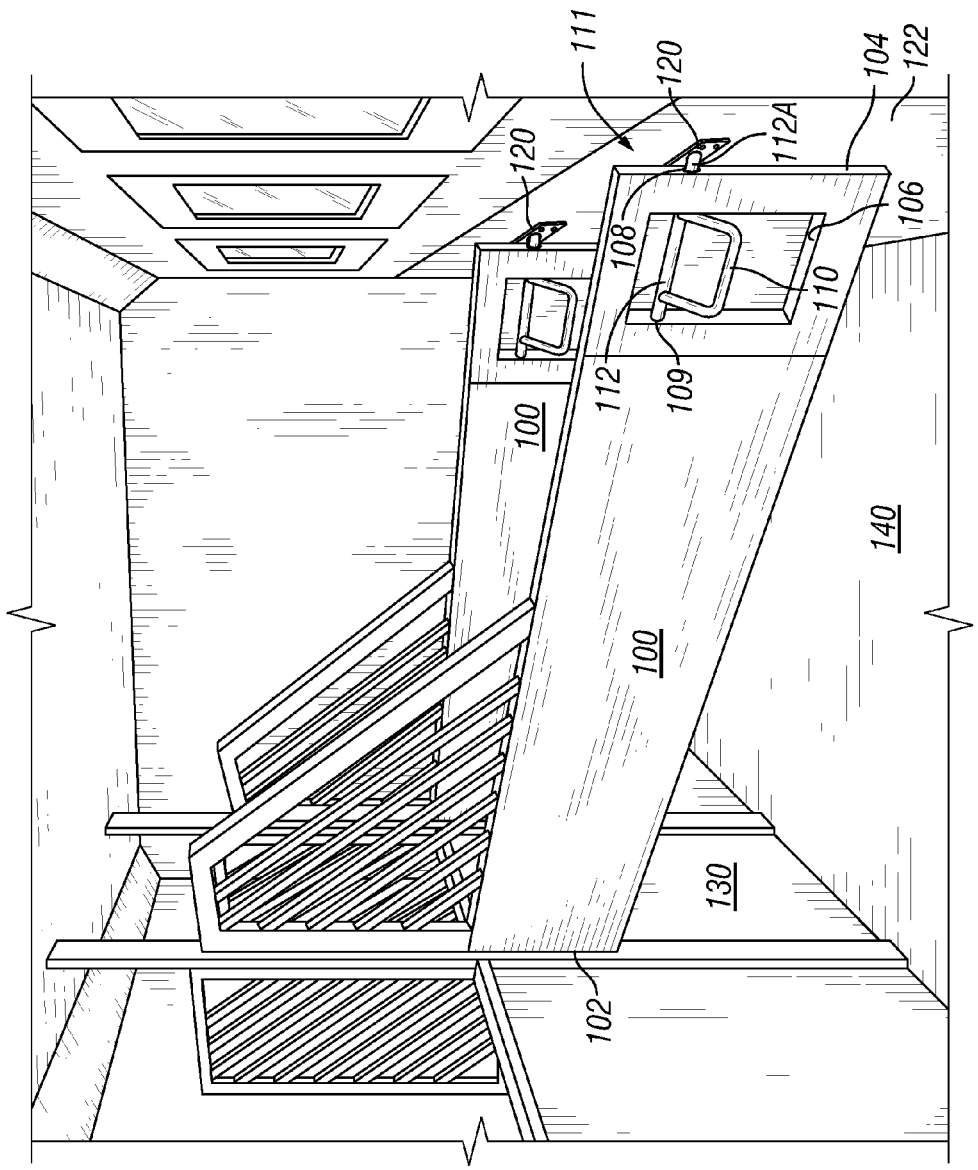
FIG. 1 is a perspective view of a prior art horse trailer with dividers in their closed position to define stalls therebetween, and each divider having a prior art latch apparatus.
Figure 2:
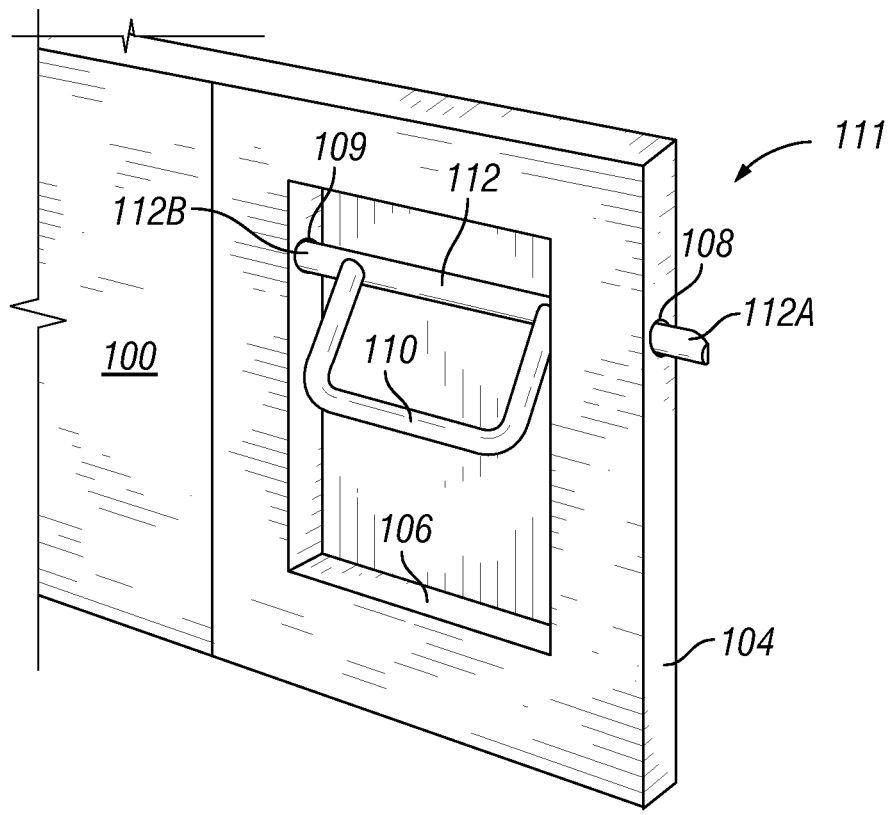
FIG. 2 is an enlarged perspective view of the prior art latch apparatus shown in FIG. 1 with the latchbolt end protruding from the edge of the divider in its deployed position.

Referring to the drawings in detail and to FIG. 1 in particular, a divider 100 is hinged at its first end 102 to a first wall 130 of the horse trailer. The second end 104 of the divider 100 is releasably securable to the second wall 122 which may be parallel to the first wall 130. Receiver 120 may be used to receive and secure the latchbolt end of a protruding latchbolt deployed from a prior art latch assembly.

As shown in FIG. 1, a prior art latch assembly or the latch assembly of the present invention may be received within a recess or an aperture 106 within on the divider 100.

Figure 3:
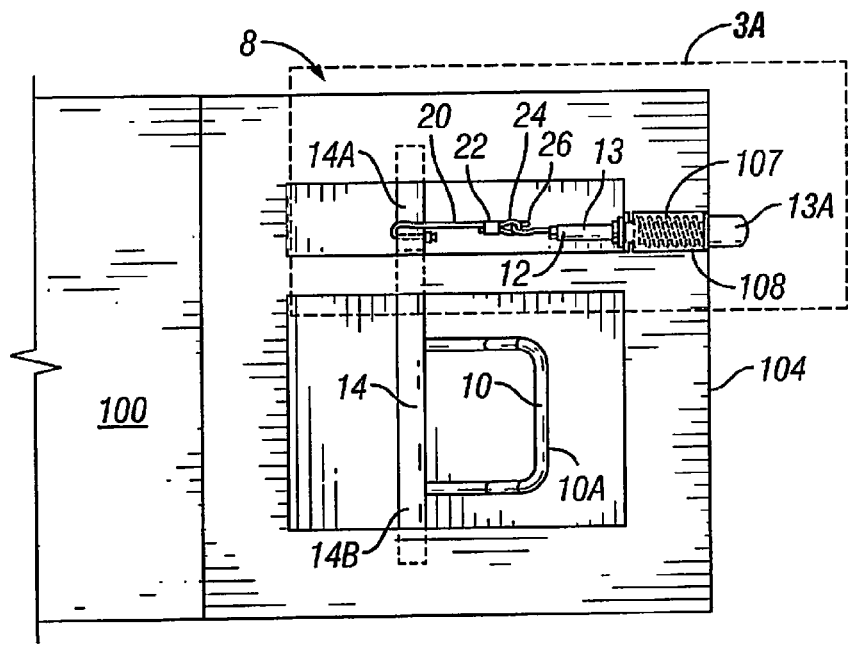
FIG. 3 is an elevation view of the latch apparatus of the present invention installed in a pivotable divider of a horse trailer. The second end of the latchbolt is protruding from the edge of the divider in its deployed position.

Turning now to FIG. 3, which shows one embodiment of the latch assembly 8 of the present invention, the latch assembly 8 comprises a handle 10 connected to an axle 14 having a first end 14A, a second end 14B, and an aperture 14C for receiving and securing the first end 20A of a tensile member comprising, in the embodiment shown in FIG. 3, a generally flexible tether 20. A loop 24 at the opposite, second end of the tether 20 is formed using a clamp 22. The loop 24 receives a hook 26 that is coupled to the first end 12 of a latchbolt 13.

Figure 3A:
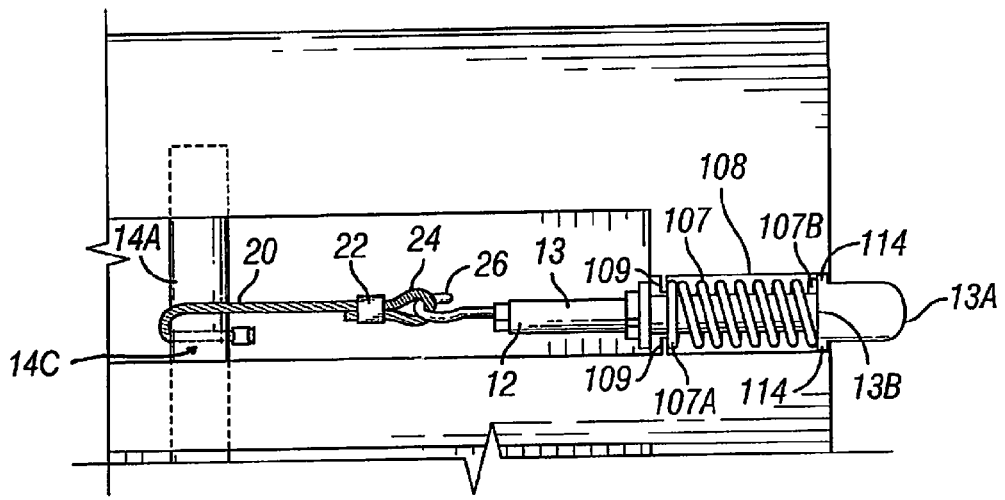
FIG. 3A is an enlarged view of the latchbolt assembly shown in FIG. 3 showing the latchbolt slidably received within the channel. A spring disposed intermediate the wall of the channel and the exterior surface of the generally cylindrical portion of the latchbolt is engaged at its first end by a radially inwardly disposed channel shoulder and at its second end by a radially outwardly disposed latchbolt shoulder. The spring is at least partially compressed from its relaxed position to bias the latchbolt end to protrude from the edge of the divider.

FIG. 3A is an enlarged view of the embodiment of the latchbolt assembly 8 shown in FIG. 3 showing the latchbolt 13 slidably received within a channel 108 in the divider 100. A coil spring 107 disposed intermediate the wall of the channel 108 and the exterior of the latchbolt 13 is engaged at its first end 107A by a radially inwardly disposed channel shoulder 109 and at its second end 107B by a radially outwardly disposed latchbolt shoulder 114. The spring 107 is at least partially compressed from its relaxed position to bias the latchbolt end 113A to substantially protrude from the edge 104 of the divider 100. The substantial protrusion of the latchbolt end 113A as biased by the spring 107 provides for securing the divider 100 in the closed position, similar to the position shown in FIG. 1 for the prior art device, when the substantially protruding latchbolt end 13A is received within an aperture or a receiver 120 mounted on the second wall 122 (not shown in FIG. 3A).

Figure 4:
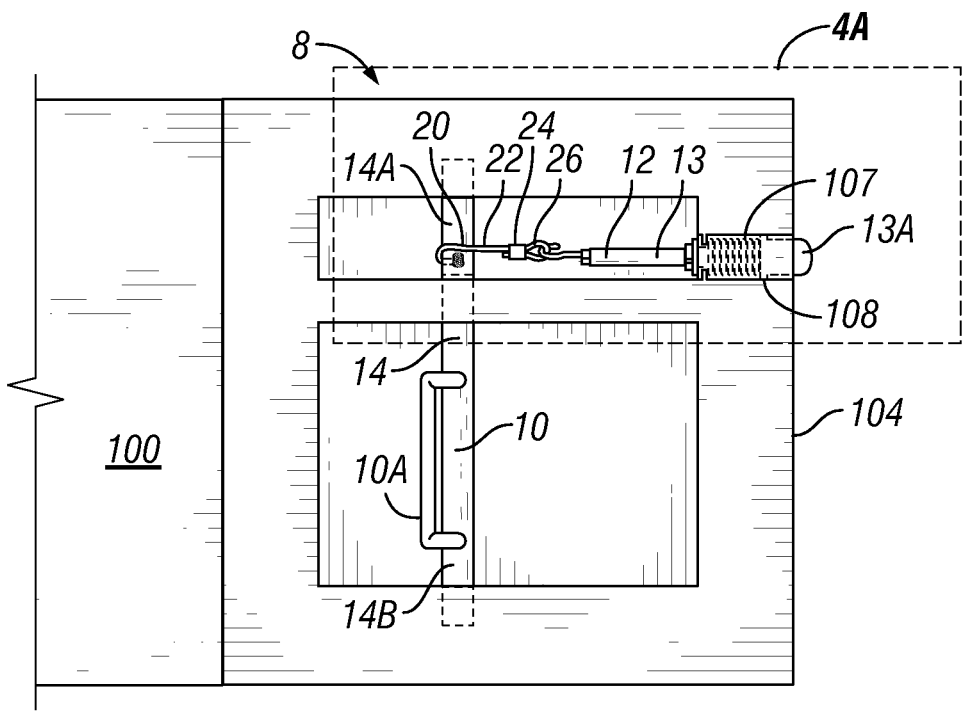
FIG. 4 is the elevation view of FIG. 3 after the latchbolt apparatus of the present invention is actuated to withdraw the latchbolt from its deployed and protruding configuration to a withdrawn position to release the divider.

FIG. 4 is the elevation view of FIG. 3 after the latchbolt apparatus 8 of the present invention is actuated to withdraw the latchbolt end 113A from its deployed and protruding configuration to its withdrawn position. The actuation of the latchbolt apparatus 8 results from the rotation of the axle 14 about its axis using the handle 10. The handle 10 shown in FIG. 4 is connected to the axle 14 at the second end of legs 11 and may comprise an angled portion 10A at the first end of the spaced-apart legs 11. The angled portion 10A may be provided to facilitate the user's grasp of the angled portion 10A of the handle 10 by encircling the fingers of the user's hand (not shown in FIG. 4) when the handle 10 is in its position shown in FIG. 3. The handle 10 is shown in FIG. 4 to be angularly displaced approximately 90 degrees from its original pre-actuation position shown in FIG. 3. The axle 14 is shown to be rotated on its axis a corresponding angle to wrap at least a portion of the first end 20A of the tether 20 around the circumference of the axle 14. As shown in FIG. 4, the resulting displacement of the loop 24 of the tether 20 towards the axle 14 to slidably displace the latchbolt 13 within the channel 108 in the divider 100. The displacement of the latchbolt 13 causes the latchbolt end 13A to be withdrawn from the receiver 120 that is mounted on the second wall 122, and the divider 100 is then released to swing about its hinged first end 102 as shown in FIG. 5.

Figure 4A:
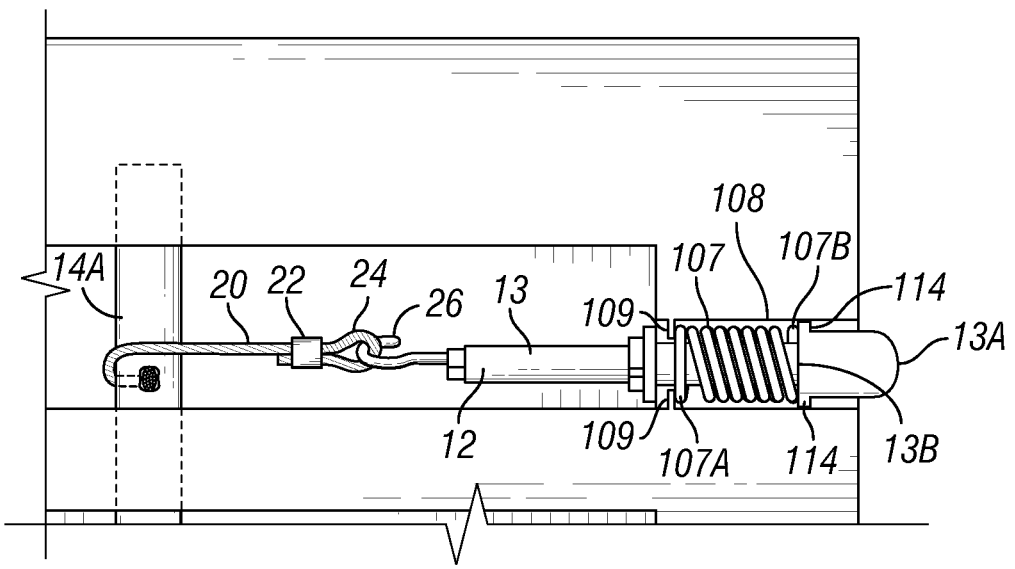
FIG. 4A is an enlarged view of the latchbolt assembly shown in FIG. 4 showing the spring disposed intermediate the latchbolt and the channel. The spring is now further compressed between the channel shoulder and the latchbolt shoulder due to the movement of the latchbolt within the channel towards the axle.

FIG. 4A is an enlarged view of the latchbolt assembly in its actuated configuration as shown in FIG. 4. FIG. 4A shows the compressed coil spring 107 disposed intermediate the latchbolt 113 and the channel 108. The spring 107 is now substantially compressed between the channel shoulder 109 and the latchbolt shoulder 114 due to the sliding movement of the latchbolt 13 within the channel 108 toward the axle 14.

Figure 5:
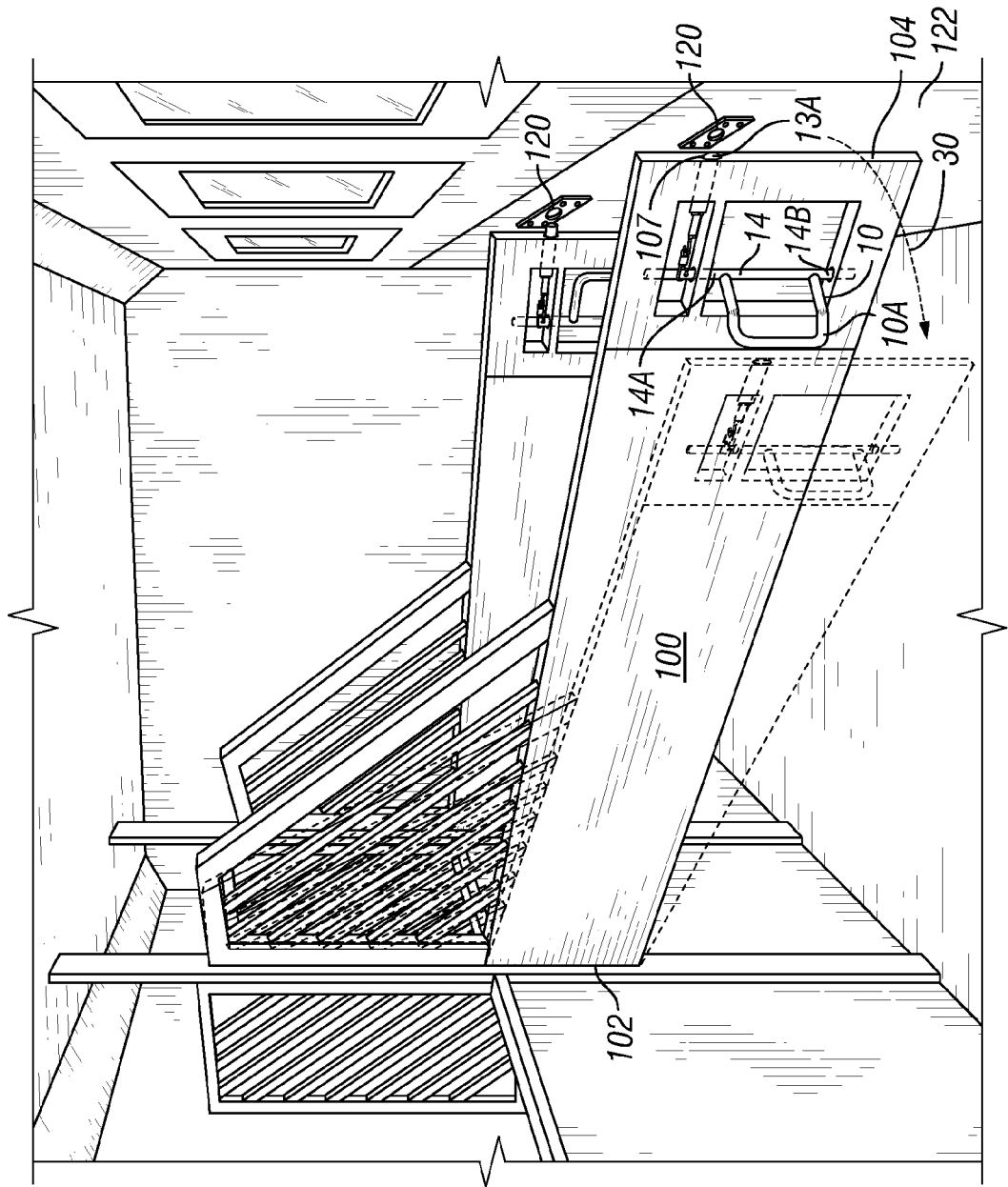
FIG. 5 is a perspective view of the embodiment of the latchbolt apparatus shown in FIGS. 3 and 4 showing the divider in its closed position, and then showing the divider swung to an open position (shown in dotted lines).

FIG. 5 is a perspective view of the embodiment of the latchbolt apparatus shown in FIGS. 3 and 4 showing the divider 100 in an open position after the latchbolt apparatus 8 has been actuated and the divider 100 angularly displaced about its hinged first end 102. The handle 10 remains in its actuated position as shown in FIGS. 4 and 4A. This position of the handle 10 enables the user to controllably position the divider 100 using the handle 10 as a gripping member. It should be noted that the handle 10 can serve a dual purpose. First, it can provide to the user a gripping member for use in actuating the latch apparatus 8 of the present invention, as shown by comparing FIG. 4A to FIG. 3A. Second, it can provide to the user a gripping member for applying a force to the divider 100 causing it to pivot about its hinged first end 102 and to swing towards an open configuration as shown by arrow 30 in FIG. 5. Advantageously, the handle 10 can enable the user to implement both functions by pulling the handle 10.

Changes may be made in the combinations, operations, and arrangements of the various parts and elements described herein without departing from the spirit and scope of the invention. For example, but not by way of limitation. The handle may be adapted to rotate the axle in the opposite direction on its axis. Similarly, a cam or other enlarged portion may be disposed on the axle 14 to engage and wrap the first end 20A of the tether 20 to displace the latchbolt 13 a predetermined and desired amount within the channel 108 of the divider 100. Also, the axle 14 may be provided with a reduced or enlarged portion to engage and wrap the first end 20A of the tether 20 to customize the amount of movement of the latchbolt end 13A from the receiver 120 so that leverage and displacement are optimized.

We claim:

1. A latch apparatus for releasably securing a pivotable divider in a closed position within a livestock trailer having at least one wall, comprising:
   an axle securable to a pivotable divider and rotatable about a first axis; wherein said axle has a hole through the axle
   a latchbolt, having a first end and a second end, slidable within a channel in the pivotable divider between a withdrawn position and a deployed position; whereby in said deployed position said latchbolt engages said wall and prevents said pivotable divider from pivoting,
   a tensile member having a first end extending through said axle hole and directly coupled to a portion of the rotatable axle, and a second end coupled to the first end of the latchbolt;
   a spring biasing the latchbolt towards the deployed position and
   a handle coupled to the axle to provide a mechanical advantage for axle rotation;
   wherein pulling the handle coupled to the axle rotates the axle on its axis to wrap at least a portion of the first end of the tensile member about at least a portion of the axle to move the latchbolt from the deployed position towards the withdrawn position to release the divider to allow the divider to pivot to an open position.

2. The latch apparatus of claim 1 wherein the pivotable divider is hingedly coupled to a vertical structure.

3. The latch apparatus of claim 1 further comprising an aperture in said all to receive the second end of the latchbolt to secure the pivotable divider against pivotal movement.

4. The latch apparatus of claim 3 wherein pulling the handle rotates the axle to pull the tensile member and the latchbolt coupled thereto against the bias of the spring.

5. The latch apparatus of claim 1 wherein the tensile member is a generally flexible tether.

6. The latch apparatus of claim 1 wherein the handle comprises an angled portion to facilitate grasping by human fingers.

7. A latch apparatus for releasably securing a pivotable divider in a closed position within a livestock trailer comprising:
   an axle securable to a pivotable divider and rotatable about a first axis;
   a latchbolt, having a first end and a second end, received within a channel in the pivotable divider and slidable within the channel between a withdrawn position and a deployed position whereby in said deployed position said latchbolt prevents said pivotable divider from pivoting;
   a tensile member having a first end coupled to the axle at a first location on said tensile member and at a first location on said axle, and a second end coupled to the first end of the latchbolt;
   the latchbolt biased towards the deployed position and
   a handle coupled to the axle;
   a first portion of the tensile member in contact the axle
   wherein rotating the handle rotates the axle on its axis to move the latchbolt from the deployed position towards the withdrawn position and to release the divider to pivot to an open position, and whereby said first end of said tensile member remains coupled to said axis at said first location on said tensile member and at said first location on said axle.

8. The latch apparatus of claim 7 wherein said axle has hole through the axle and the tensile member passes through the hole.

* * * * *